United States Patent
Al-Omari et al.

(10) Patent No.: US 11,709,891 B2
(45) Date of Patent: Jul. 25, 2023

(54) RUNTIME METRIC ESTIMATIONS FOR FUNCTIONS

(71) Applicant: TERADATA US, INC., San Diego, CA (US)

(72) Inventors: Awny Kayed Al-Omari, Cedar Park, TX (US); Mohammed Al-Kateb, Rancho Palos Verdes, CA (US); Mohamed Ahmed Yassin Eltabakh, Worcester, MA (US); Douglas Paul Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 266 days.

(21) Appl. No.: 17/139,057

(22) Filed: Dec. 31, 2020

(65) Prior Publication Data
US 2022/0207084 A1    Jun. 30, 2022

(51) Int. Cl.
*G06F 16/00* (2019.01)
*G06F 16/835* (2019.01)
*G06N 20/00* (2019.01)
*G06F 16/242* (2019.01)

(52) U.S. Cl.
CPC ........ *G06F 16/8365* (2019.01); *G06F 16/242* (2019.01); *G06N 20/00* (2019.01)

(58) Field of Classification Search
CPC .............. G06F 16/8365; G06F 16/242; G06F 16/24542; G06F 16/2453; G06F 16/24545; G06F 16/24549; G06N 20/00
See application file for complete search history.

(56) References Cited

U.S. PATENT DOCUMENTS

| | | | | |
|---|---|---|---|---|
| 5,544,355 A * | 8/1996 | Chaudhuri | ........ | G06F 16/24542 |
| 7,356,526 B2 * | 4/2008 | Gao | .................. | G06F 16/24547 |
| | | | | 707/999.005 |
| 10,747,638 B2 * | 8/2020 | Rose | .................. | G06F 9/45504 |
| 2003/0009446 A1 * | 1/2003 | Agarwal | ............ | G06F 16/24547 |
| 2004/0210563 A1 * | 10/2004 | Zait | ........................ | G06F 16/22 |
| 2005/0165741 A1 * | 7/2005 | Gordon | ................ | G06F 16/217 |
| 2008/0127149 A1 * | 5/2008 | Kosche | .................. | G06F 8/443 |
| | | | | 717/158 |
| 2009/0030874 A1 * | 1/2009 | Das | .................. | G06F 16/24542 |
| 2010/0145929 A1 * | 6/2010 | Burger | .............. | G06F 16/24542 |
| | | | | 707/E17.017 |
| 2014/0310249 A1 * | 10/2014 | Kowalski | ............ | G06F 16/2455 |
| | | | | 707/688 |
| 2020/0183921 A1 * | 6/2020 | Subramanian | ........ | G06F 16/278 |

(Continued)

OTHER PUBLICATIONS

Teradata, Teradata Workload Management, User Guide, Release 16.20, B035-1197-162K, Nov. 2017 (110 pages).

(Continued)

*Primary Examiner* — Jared M Bibbee
(74) *Attorney, Agent, or Firm* — Trop Pruner & Hu P.C.

(57) ABSTRACT

In some examples, a system receives function descriptors for different types of functions to be used when processing database queries, each function descriptor of the function descriptors comprising information relating to a respective function of the different types of functions. The system computes, based on a first function descriptor for a first function of the different types of functions, an estimate of a runtime metric associated with execution of the first function for processing a database query.

20 Claims, 3 Drawing Sheets

(56) References Cited

U.S. PATENT DOCUMENTS

2020/0210387 A1* 7/2020 Brown ..................... G06N 5/04
2021/0382920 A1* 12/2021 Eltabakh ............... G06F 16/288

OTHER PUBLICATIONS

Dracle, Data Cartridge Developer's Guide, Using Extensible Optimizer downloaded Dec. 18, 2020 (25 pages).
Oracle, Oracle8 interMedia Text Reference, Release 8.1.5, A67843-01, A Working with the Extensible Query Optimizer downloaded Dec. 18, 2020 (7 pages).

* cited by examiner

RUNTIME METRIC ESTIMATIONS FOR FUNCTIONS

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

BRIEF DESCRIPTION OF THE DRAWINGS

Some implementations of the present disclosure are described with respect to the following figures.

Figure 1:
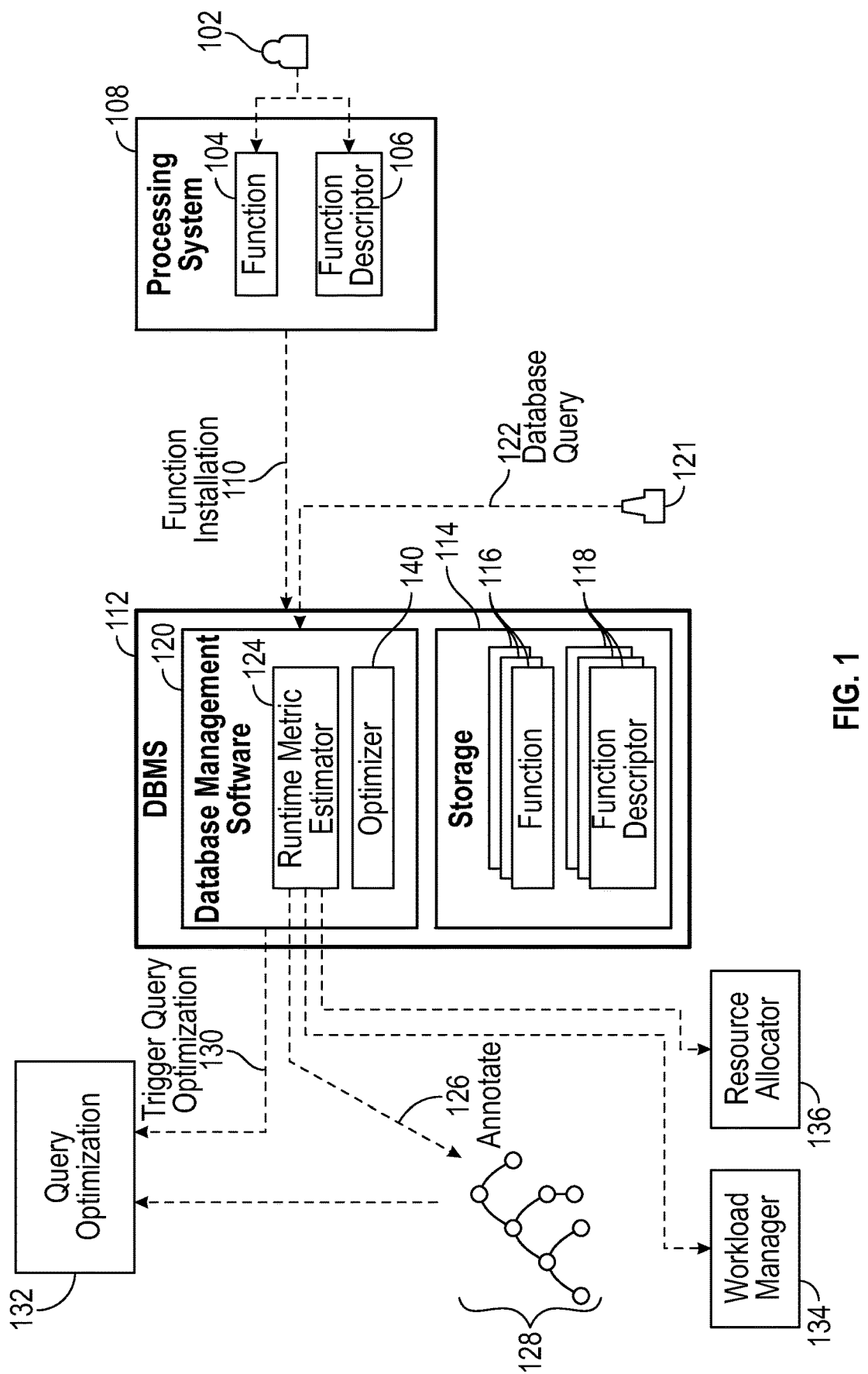
FIG. 1 is a block diagram of an example arrangement to compute an estimate of a runtime metric, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Analytics functions may be used by a DBMS when processing a database query. In other examples, analytics functions may be used in an analytics framework, which can include a system that performs analytics on data. An analytics function (or more simply, a "function") can perform any of various tasks.

Generally, a function can produce an output based on an input received by the function. The function can be applied on data contained in database tables, data in data frames, data in datasets, and so forth. Examples of functions include system functions, user-defined functions (UDFs), and/or remote functions. A "system function" can refer to a function that may be predefined for use in a DBMS. For example, the system function may be may be part of the database management software of the DBMS, part of a function library that may be invoked by the database management software, or may be part of a different source of functions.

A "UDF" can refer to a function provided by a user of a DBMS or an analytics framework, where a "user" can refer to a human user, a program, or a machine.

A "remote" function can refer to a function that is executed at a remote system that is remotely located from a DBMS or an analytics framework. The remote system can be coupled over a network (e.g., the Internet, a local area network or LAN, a wide area network or WAN, etc.). For example, the remote system may be a cloud system, such as a cloud system that includes a data store storing objects containing data records that can be processed during a database operation in a DBMS or an operation of an analytics framework. Other types of remote systems include a server, a data center, and so forth.

A runtime metric associated with a function may be used to improve performance associated with execution of the function when performing a database operation in response to a database query. A "a runtime metric" is a measure related to an operational characteristic of the function during execution. In some examples, a runtime metric relates to use of a resource during execution of the function. The resource can include a processor, a memory, a persistent storage, a network, an input/output (I/O) device, a program (e.g., software and/or firmware), or any other type of resource. For example, a runtime metric relating to the processor can include a measure of utilization of the processor during execution of the function, where processor utilization can be expressed as a number of cycles of the processor used in executing the function, a processor time involved in executing the function, and so forth.

A runtime metric relating to a memory or a persistent storage can refer to an amount of the memory or persistent storage used for storing data of the function during execution, a quantity of accesses (reads and/or writes) of data in the memory or persistent storage during execution of the function, and so forth.

A runtime metric relating to a network can refer to an amount of network bandwidth used for communicating data during execution of the function, a number of data units (e.g., packets, frames, or other units of data) communicated during execution of the function, and so forth.

A runtime metric relating to an I/O device can refer to a measure of utilization of the I/O device during execution of the function, a quantity of I/O operations performed by the I/O device during execution of the function, and so forth.

Another runtime metric can relate to an elapsed time associated with execution of the function from start to finish.

A further runtime metric is a dataflow metric, which relates to a quantity of data flows associated with execution of the function. The quantity of data flows can be based on the cardinality (number of data rows) of an output produced by the function, a quantity of distinct values of an attribute, and so forth.

Although some examples of runtime metrics have been provided above, it is noted that in further examples, additional or alternative runtime metrics can be employed.

Estimated runtime metrics may be useful for various purposes. For example, a runtime metric estimated for a function can be used as part of a query plan optimization performed by an optimizer of the DBMS for a database query. A "database query" can refer to an SQL query, a load request, or any other type of request that involves access of data managed by the DBMS.

Query plan optimization involves developing, by the optimizer, multiple query plans for a database query, computing cost estimates of the query plans, and selecting, by the optimizer based on the cost estimates, a query plan from among the multiple query plans to use for the database query. The selection of the query plan from among multiple query plans may be based on a comparison of the cost estimates for the respective query plans.

An estimated runtime metric associated with a function can be used as part of computing cost estimates for query plans in which the function is invoked. In further examples, estimates of runtime metrics can be employed as part of workload management in a DBMS or an analytics framework. Workload management is performed to manage workloads. A workload can include a number of database queries. There may be different categories or classes of workloads, each with its collection of database queries. Examples of workload management can include setting priorities for database queries, monitoring resource usage patterns, tuning performance of database queries, and performing capacity planning for workloads.

Workload management can also involve filtering database queries such that some database queries are rejected before they start execution, throttling execution of database queries across workloads such that some database queries are delayed when certain conditions are present, metering database queries such that database queries are submitted to the DBMS by a workload manager to a specified rate, performing scheduling that includes resource allocation among other tasks, setting a restriction on the quantity of sessions that can be set up to execute workloads, ensuring that execution of workloads satisfies service level agreements (SLAs), classifying workloads, and so forth. In some examples, estimated runtime metrics may be used for one or more of the following tasks of workload management: filtering, throttling, metering, scheduling, and so forth.

Resource allocation can also be based on estimated runtime metrics. Resource allocation refers to allocating resources to use when executing the function or a database operation or workload that invokes the function. A resource can include a processor, a memory, a persistent storage, a network, an I/O device, or a program, as examples. The resource can be part of the DBMS, an analytics framework, or a remote system. Resource allocation can be performed by a resource allocator, which receives an estimated runtime metric of a function, and performs resource allocation based on the runtime metric. An accurate runtime metric estimate for a function may be useful for efficient allocation of resources.

It may be challenging to compute estimated runtime metrics for functions, as a DBMS or analytics framework may not have the ability to estimate a runtime metric for a function, particularly a UDF or a remote function. In some examples, default cost models may be used to estimate a runtime metric for functions. However, such default cost models may not produce accurate runtime metric estimates, particularly since functions can vary in complexity.

Moreover, computing estimated runtime metrics for functions executed in a remote system (e.g., a cloud system, etc.) may be even more challenging, since the runtime infrastructure of the remote system is abstracted from a processing layer of a DBMS or analytics system, and the runtime infrastructure of the remote system can vary between different cloud vendors and different deployment options of the same vendor. Note further that when executing functions in a cloud system, tenants of the cloud system are charged fees based on usage of resources of the cloud system. Accurate runtime metric estimates for functions executed in the cloud system can allow for more accurate charges to tenants for resource usage.

In accordance with some implementations of the present disclosure, function descriptors are provided to allow for computations of estimates of runtime metrics associated with use of respective functions in a DBMS or analytics framework. A function descriptor for a function includes information relating to one or more properties of the function, and the information in the function descriptor can be used in computing an estimate of a runtime metric for the function. Examples of such information are discussed further below.

In some examples, a function descriptor can be expressed with markup language instructions. The markup language may be based on Java Script Object Notation (JSON) or any similar method or language for expressing one or more properties of a function. In other examples, function descriptors can be expressed in other formats.

FIG. 1 is a block diagram illustrating an example arrangement for computing an estimate of a runtime metric. During development of a function 104 (e.g., a system function, a UDF, or a remote function) by a developer 102, which may be a human developer, a program, or a machine, the corresponding function descriptor 106 may be provided for the function 104. The function descriptor 106 is created by the developer 102.

The function 104 and the associated function descriptor 106 can be provided to a processing system 108, which can be a computer system (e.g., a desktop computer, a notebook computer, a server computer, etc.). The processing system 108 can install (at 110) the function 104 into a DBMS 112. As part of installation of the function 104, the associated function descriptor 106 can also be provided to the DBMS 112.

In other examples, instead of the DBMS 112, the function 104 and the associated function descriptor 106 can be installed into an analytics framework. In further examples, the function 104 may be a remote function executed in a remote system separate from the DBMS 112 (or an analytics framework). In such further examples, the processing system 108 may install the function 104 into the remote system, and provide the function descriptor 106 to the DBMS 112 (or an analytics framework).

In the ensuing discussion, it is assumed that the function 104 and the associated function descriptor 106 are provided to the DBMS 112. Similar techniques can be applied in other examples that involve an analytics framework and/or a remote system.

The DBMS 112 includes a storage 114 to store functions 116 (including the function 104) and associated function descriptors 118 (including the function descriptor 106). The storage 114 can be implemented using one or more storage devices, such as a disk-based device, a solid state drive, a memory device, and so forth.

Note that the developer 102 can develop multiple functions and corresponding function descriptors. Note further that there may be multiple developers for developing respective different functions, and the multiple developers can provide their respective functions and function descriptors to the processing system 108 (or to a different processing system) for installing the functions into the DBMS 112.

The DBMS 112 includes database management software 120. A user 121 can submit a database query 122 to the DBMS 112. A "user" can refer to a human user, a program, or a machine.

The database management software 120 processes the received database query. In examples where the database query invokes one or more functions 116, a runtime metric estimator 124 that is part of the database management software 120 can access the respective one or more function descriptors 118 for the one or more functions 116 invoked by the database query. The runtime metric estimator 124 computes, using a respective function descriptor 118, an estimate of a runtime metric for each function of the one or more functions 116.

Note that the computation of an estimated runtime metric is performed prior to processing of the database query 122. Thus, prior to an optimizer 140 performing a query optimization for the database query 122, the runtime metric of a function is estimated by the runtime metric estimator 124. Note that the runtime metric estimator 124 may be part of or separate from the optimizer 140.

The runtime metric estimator 124 can annotate (at 126) a query tree 128 that represents a query plan for the database query 122. Each node of the query tree 128 represents a corresponding executable step (or a collection of executable steps) of the query plan. A given node in the query plan can represent an executable step (or a collection of executable steps) in which a given function 116 is invoked. The runtime metric estimator 124 can annotate (at 126) this given node with a computed estimate of a runtime metric for the given function 116. The estimated runtime metric that is annotated to the given node can be used in performing a cost estimate by the optimizer 140 of the database management software 120, for example.

The database management software 120 can trigger (at 130) a query optimization 132, which can compute cost estimates (using the estimated runtime metric of the given function 116) for different query plans for the database query 122. The optimizer 140 can select a query plan from among the query plans based on the cost estimates.

In addition to or instead of using estimated runtime metrics for functions in query optimizations, the estimated runtime metrics can be provided by the runtime metric estimator 124 to a workload manager 134 that performs workload management in the DBMS 112. Additionally, or alternatively, the runtime metric estimator 124 can also provide estimated runtime metrics to a resource allocator 136 that performs allocation of resources. In some examples, the resource allocator 136 is part of the DBMS 112, which can perform resource allocation in the DBMS 112 for executing a function or a database operation that invokes the function. In other examples, the resource allocator 136 may be part of a remote system.

In some examples, a function descriptor (e.g., 106 or 118) can include the following information: a list of constants $\{ci\}$ (i=1 to M) (a list of name(s) of the constant(s) and corresponding value(s) of the constant(s), a list of arguments $\{aj\}$ (j=1 to N) (a list of name(s) of the argument(s) and corresponding value(s) of the argument(s), and a list of function inputs $\{tk\}$ (k=1 to P) of the function (a list of name(s) of the function input(s) and corresponding value(s) of the function input(s)). A "list" of information elements can refer to any collection that includes one or more of the information elements. Each of M, N, and P can be equal to 1 or greater than 1.

A constant $\{ci\}$ can refer to a predefined value that represents an operational characteristic associated with execution of the function. An argument $\{aj\}$ can refer to an input parameter of the function, where the input parameter can be dynamically changed in different invocations of the function. An input $\{tk\}$ of a function can refer to input data received by the function to compute an output.

In addition to the foregoing lists of information elements, the function descriptor can also include a formula to be used to compute a runtime metric estimate based on the values of $\{ci\}$, $\{aj\}$, and $\{tk\}$. The formula can be expressed using a textual based math format, or using a markup language.

For example, the runtime metric can be estimated by the runtime metric estimator 124 using the following formula:

$$\text{Runtime\_Metric\_Estimate} = F(\{ci\}, \{aj\}, \{tk\}).$$

In some examples, if the function is a K-means clustering function, then examples of the list of arguments $\{ai\}$ can include any one or more of: a quantity of clusters to be identified by the K-means clustering function, a number of iterations to be performed by the K-means clustering function in identifying clusters, and so forth.

Also assume that a runtime metric to be computed for the K-means clustering function is a processor utilization metric (Processor_Utilization), which can be computed as:

$$\text{Processor\_Utilization} = C1 + arg\_iterations*(C2 + C3*arg\_num\_clusters*\text{Cardinality}(t1)).$$

In the foregoing formula, C1, C2, and C3 are in the list of constants $\{ci\}$, arg_iterations (number of iterations) and arg_num_clusters (quantity of clusters) are in the list of arguments $\{aj\}$, and Cardinality(t1) is the quantity of table rows in input data t1 which is the single member in the list of function inputs $\{tk\}$. In an example, C1 represents a startup overhead of the K-means clustering function (e.g., a processing burden on the processor in starting up the K-means clustering function), C2 represents an iteration overhead (e.g., a processing burden on the processor in performing each iteration of multiple iterations of the K-means clustering), and C3 represents an overhead of performing a comparison of data in a table row to the table rows of a cluster.

In other examples, other runtime metric formulas can be used for computing other types of runtime metrics for other types of functions, where such other runtime metric formulas can use other lists of constants, arguments, and function inputs.

In response to a database query that invokes a given function, the runtime metric estimator 124 accesses a respective given function descriptor (one of 118 in the storage 114 of FIG. 1) and uses the formula in the given function descriptor to compute the respective estimated runtime metric using values of $\{ci\}$, $\{aj\}$, and $\{tk\}$.

In further examples, instead of using just one list of constants $\{ci\}$, multiple lists of constants $\{ci\}_r$ (r>1) can be used. Each list of constants $\{ci\}_1$, $\{ci\}_2$, and so forth can correspond to a respective profile. Thus, if a first profile is applicable, then a first list of constants $\{ci\}_1$ is used, if a second profile is applicable, then a second list of constants $\{ci\}_2$ is used, and so forth. For example, profiles can include hardware profiles that define respective arrangements of hardware components in a system, such as a DBMS, an analytics framework, a remote system, and so forth. As another example, profiles can include software profiles that define respective arrangements of software components.

The list of constants $\{ci\}_r$ selected by the runtime metric estimator 124 is based on a determination by the runtime metric estimator 124 of which of the multiple profiles matches a given environment in which the function is to be executed.

In further examples, certain constants may be tunable (adaptively changeable) based on application of machine learning. Such constants that are referred to as tunable parameters, included in a list of parameters $\{px\}$ (x=1 to Q), where Q can be equal to 1 or greater than 1. The list of parameters $\{px\}$ can be adaptively changed after a function has been executed and actual runtime metrics have been collected for the function, and compared to estimated runtime metrics computed by the runtime metric estimator 124.

The values of the list of parameters {px} that are initially set may not be accurate for a given runtime configuration or environment, which may change over time. The list of parameters {px} includes a list of name(s) of the parameter(s) and corresponding value(s).

In examples where the list of parameters {px} is used, a runtime metric can be estimated by the runtime metric estimator 124 using the following formula:

Runtime_Metric_Estimate=$F(\{px\},\{ci\},\{aj\},\{tk\})$.

Figure 2:
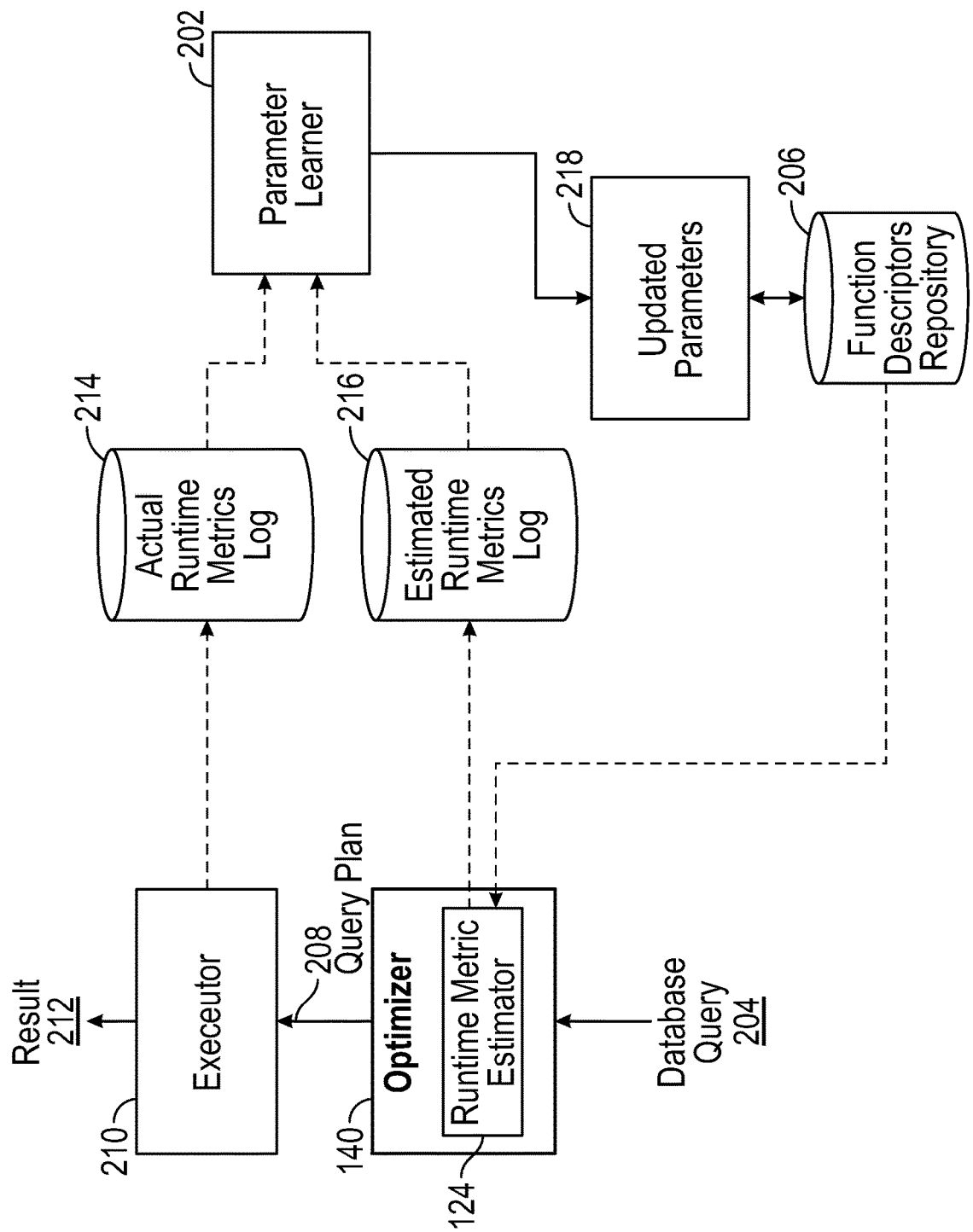
FIG. 2 is a block diagram of an example arrangement that includes a parameter learner, according to further implementations of the present disclosure.

FIG. 2 shows an example arrangement in which a parameter learner 202 is used to update one or more parameters of a list of parameters {px} in a function descriptor for a function. The parameter learner 202 is a machine learner that applies a machine learning algorithm. In the example of FIG. 2, it is assumed that the runtime metric estimator 124 is part of the optimizer 140. The parameter learner 202 can be implemented using machine-readable instructions executed in the DBMS 112 (FIG. 1) or another system.

In response to a database query 204 that invokes a given function, the runtime metric estimator 124 accesses a respective given function descriptor from a function descriptors repository 206. The runtime metric estimator 124 computes an estimated runtime metric using a formula in the given function descriptor, based on values of ({px}, {ci}, {aj}, {tk}. The runtime metric estimator 124 initially uses the initial value(s) defined for the parameter(s) in {px} in the given function descriptor.

Later, the value(s) of the parameter(s) in {px} in the given function descriptor can be adaptively changed by the parameter learner 202.

Using the estimated runtime metric for the function, the optimizer 140 produces a selected query plan 208, which is provided to an executor 210 of the DBMS 112 (FIG. 1) for execution of the executable steps of the selected query plan 208. In some examples, the executor 210 can include multiple processing engines across which the executable steps of the selected query plan 208 for parallel execution. The executor 210 produces a result 212 for the database query 204.

At query execution time by the executor 210, actual runtime metrics are collected by the DBMS 112 and logged in an actual runtime metrics log 214, which may store the actual runtime metrics in one or more tables. Note that an actual runtime metric refers to a value of a runtime metric (e.g., actual quantity of processor cycles consumed, actual processor time consumed, etc.) observed based on execution of a function.

Estimated runtime metrics computed by the runtime metric estimator 124 can be stored in an estimated runtime metrics log 216.

The parameter learner 202 can run periodically or in response to another event (e.g., an event corresponding to a quantity (e.g., R 1) of new entries in the actual runtime metrics log 214 for a given function). The parameter learner 202 uses the new actual runtime metric entries (containing respective values of the actual runtime metric), a summary of historic values of the runtime metric, and the current values of {px} to estimate more accurate and up-to-date values for {px}. The parameter learner 202 can be an optimization module (that uses a stochastic gradient algorithm, for example) that attempts to minimize, with respect to the parameters {px}, the following objective function:

Objective_Function =

Sum(Error*Error)/R over collected actual runtime metrics of size R where

Error = actual runtime metric − estimated runtime metric({px}).

The sum above is over the R collected actual runtime metrics.

The parameter learner 202 can try different values of {px} to find updated values for the list of parameters {px} that minimizes the above objective function.

Updated parameters {px} 218 generated by the parameter learner 202 for the function are written to a corresponding function descriptor in the function descriptors repository 206. The updated parameters {px} 218 in the corresponding function descriptor can be used in a subsequent iteration of the runtime metric estimator to compute an estimated runtime metric for the function.

In some examples, more recent collected actual runtime metrics can be given more influence by assigning a higher weight for the last T (T 1) entries compared to less recent collected actual runtime metrics. Assigning greater weight to more recent collected actual runtime metrics allows for better adaptation to a changing system environment.

Using the parameter learner 202 to adapt values of the parameters {px}, calibration of constants used in a formula for computing a runtime metric estimate does not have to be performed, since the parameter values are tuned to the system environment.

Figure 3:
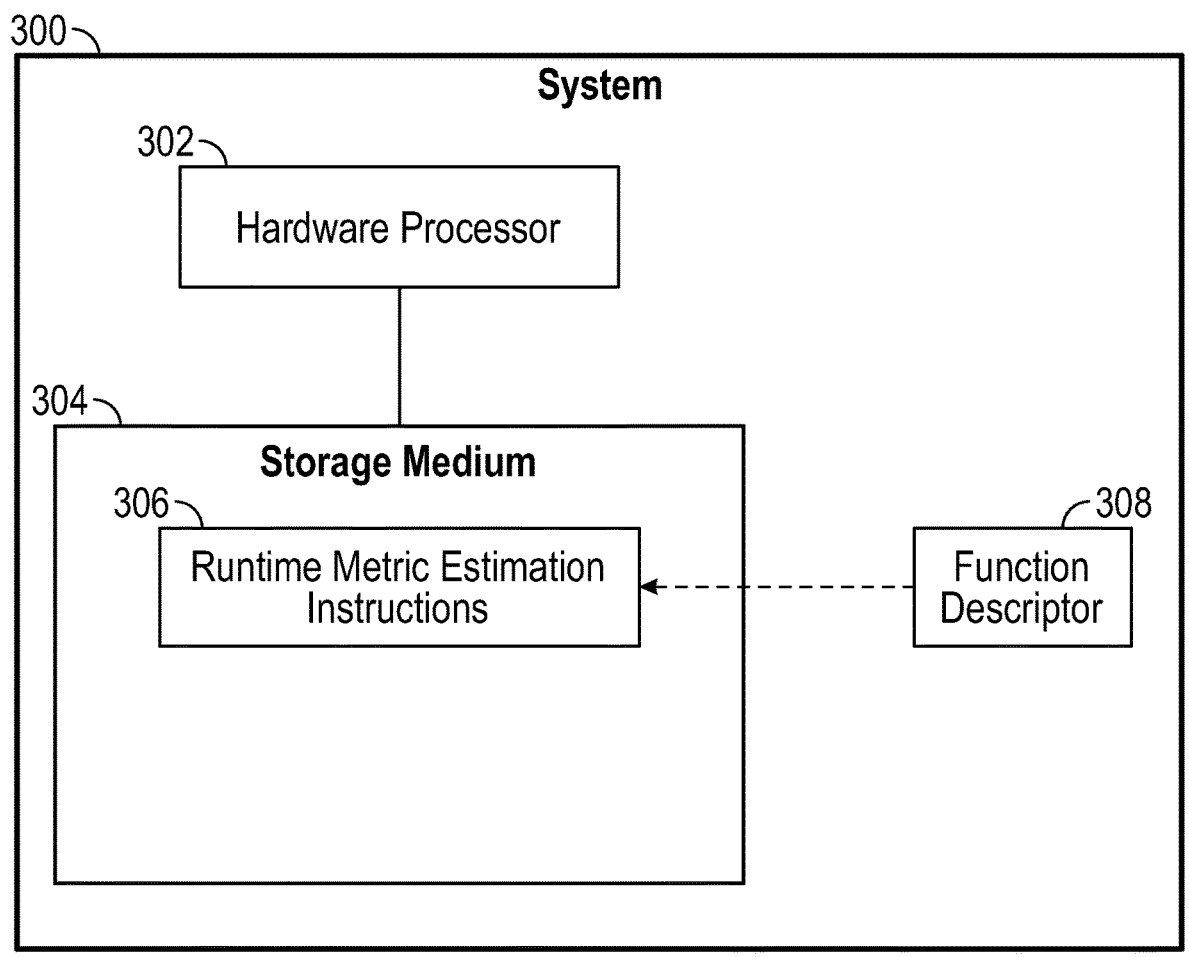
FIG. 3 is a block diagram of an example system according to some implementations of the present disclosure.

FIG. 3 is a block diagram of a system 300 according to some implementations, which can be a DBMS (e.g., 102 in FIG. 1) or a computer system of an analytics framework.

The system 300 includes one or more hardware processors 302. A hardware processor can include a microprocessor, a core of a multi-core microprocessor, a microcontroller, a programmable integrated circuit, a programmable gate array, or another hardware processing circuit.

The system 300 includes a non-transitory machine-readable or computer-readable storage medium 304 that stores machine-readable instructions executable on the one or more hardware processor 302 to perform various tasks.

The machine-readable instructions include runtime metric estimation instructions 306 (e.g., the runtime metric estimator 124 of FIG. 1 or 2). The runtime metric estimation instructions 306 when executed receives function descriptors for different types of functions to be used when processing database queries, where each function descriptor of the function descriptors includes information relating to a respective function of the different types of functions. The different types of functions include a system function, a UDF, and a remote function.

The runtime metric estimation instructions 306 when executed computes, based on a first function descriptor for a first function of the different types of functions, an estimate of a runtime metric associated with execution of the first function for processing a database query.

The runtime metric estimation instructions 306 when executed uses the estimate of the runtime metric in performing one or more of a query optimization, a workload management, and a resource allocation.

In some examples, a function descriptor includes a formula for computing a runtime metric estimate, and further includes one or more information elements (e.g., constants, parameters, arguments, function inputs, etc.) to be applied in the formula.

The storage medium 304 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive function descriptors for different types of functions to be used when processing database queries, each function descriptor of the function descriptors comprising information relating to a respective function of the different types of functions;
   compute, based on a first function descriptor for a first function of the different types of functions, an estimate of a runtime metric associated with execution of the first function for processing a database query, wherein the first function descriptor comprises a parameter, and the estimate of the runtime metric is based on a value of the parameter; and
   update the value of the parameter based on the estimate of the runtime metric and an actual value of the runtime metric collected as part of executing the first function.

2. The non-transitory machine-readable storage medium of claim 1, wherein the first function descriptor comprises a formula for use in computing the estimate of the runtime metric.

3. The non-transitory machine-readable storage medium of claim 2, wherein the first function descriptor further comprises one or more information elements to be applied in the formula.

4. The non-transitory machine-readable storage medium of claim 1, wherein the runtime metric relates to use of a resource during the execution of the first function.

5. The non-transitory machine-readable storage medium of claim 1, wherein the runtime metric comprises a dataflow metric.

6. The non-transitory machine-readable storage medium of claim 1, wherein the runtime metric comprises an elapsed time associated with the execution of the first function.

7. The non-transitory machine-readable storage medium of claim 1, wherein the instructions upon execution cause the system to:
   select, with an optimizer in a database system, a query plan using the estimate of the runtime metric.

8. The non-transitory machine-readable storage medium of claim 1, wherein the instructions upon execution cause the system to:
   use the estimate of the runtime metric for at least one task of a workload management of a database system, the at least one task of the workload management comprising one or more of filtering database queries, throttling execution of database queries, metering database queries, and performing scheduling.

9. The non-transitory machine-readable storage medium of claim 1, wherein the instructions upon execution cause the system to:
   send the estimate of the runtime metric to a remote system for use in performing a resource allocation of a resource in the remote system that is to execute the first function.

10. The non-transitory machine-readable storage medium of claim 1, wherein the first function comprises a system function of a database system.

11. The non-transitory machine-readable storage medium of claim 1, wherein the first function comprises a user-defined function executable in a database system.

12. The non-transitory machine-readable storage medium of claim 1, wherein the first function comprises a remote function to execute in a remote system that is remote from the system.

13. The non-transitory machine-readable storage medium of claim 1, wherein the first function comprises a clustering function to identify clusters of data.

14. The non-transitory machine-readable storage medium of claim 1, wherein the updating of the value of the parameter is performed by a machine learner.

15. The non-transitory machine-readable storage medium of claim 1, wherein the instructions upon execution cause the system to:
   compute a further estimate of the runtime metric using the updated value of the parameter associated with use of the first function for processing another database query.

16. A system comprising:
   at least one processor; and
   a non-transitory storage medium storing instructions executable on the at least one processor to:
      receive function descriptors for different types of functions to be used when processing database queries, each function descriptor of the function descriptors comprising information relating to a respective function of the different types of functions;
      compute, based on a first function descriptor for a first function of the different types of functions, an estimate of a runtime metric associated with execution of the first function for processing a database query, wherein the first function descriptor comprises a parameter, and the estimate of the runtime metric is based on a value of the Parameter;
      update the value of the parameter based on the estimate of the runtime metric and an actual value of the runtime metric collected as part of executing the first function; and
      use the estimate of the runtime metric in performing one or more of a query optimization, a workload management, and a resource allocation.

17. The system of claim 16, wherein the first function descriptor comprises a formula for use in computing the estimate of the runtime metric.

18. The system of claim 17, and wherein the instructions are executable on the at least one processor to:
   compute the estimate of the runtime metric using the formula.

19. A method of a system comprising a hardware processor, comprising:
   receiving function descriptors for different types of functions to be used when processing database queries, each function descriptor of the function descriptors comprising information relating to a respective function of the different types of functions, wherein the different types of functions comprise a remote function executable in a remote system that is separate from the system;
   computing, based on a first function descriptor for a first function of the different types of functions, an estimate of a runtime metric associated with execution of the first function for processing a database query, wherein the first function descriptor comprises a parameter to be used in computing the estimate of the runtime metric; and
   updating a value of the parameter based on the estimate of the runtime metric and an actual value of the runtime metric collected as part of executing the first function.

20. The method of claim 19, wherein the first function descriptor comprises a formula, and the computing of the estimate of the runtime metric uses the formula in the first function descriptor.

* * * * *